(12) United States Patent
Grabowski et al.

(10) Patent No.: US 11,862,880 B2
(45) Date of Patent: Jan. 2, 2024

(54) COMPRESSIBLE ELECTRICAL CONTACTS WITH DIVARICATED-CUT SECTIONS

(71) Applicant: Corning Optical Communications RF LLC, Glendale, AZ (US)

(72) Inventors: Daniel Michael Grabowski, Goodyear, AZ (US); Casey Roy Stein, Surprise, AZ (US)

(73) Assignee: CORNING OPTICAL COMMUNICATIONS RF LLC, Glendale, AZ (US)

( * ) Notice: Subject to any disclaimer, the term of this patent is extended or adjusted under 35 U.S.C. 154(b) by 280 days.

(21) Appl. No.: 17/334,307

(22) Filed: May 28, 2021

(65) Prior Publication Data

US 2021/0288425 A1 Sep. 16, 2021

Related U.S. Application Data

(63) Continuation of application No. PCT/US2019/062537, filed on Nov. 21, 2019.
(Continued)

(51) Int. Cl.
*H01R 12/73* (2011.01)
*H01R 13/24* (2006.01)
(Continued)

(52) U.S. Cl.
CPC ......... *H01R 12/73* (2013.01); *H01R 13/2407* (2013.01); *H01R 24/50* (2013.01); *H01R 43/16* (2013.01); *H01R 2103/00* (2013.01)

(58) Field of Classification Search
CPC .... H01R 12/73; H01R 13/2407; H01R 24/50; H01R 43/16; H01R 2103/00
(Continued)

(56) References Cited

U.S. PATENT DOCUMENTS 4,778,404 A * 10/1988 Pass ................... H01R 13/2428
439/948
4,790,700 A * 12/1988 Schwartzman ....... B23B 31/266
267/181

(Continued)

FOREIGN PATENT DOCUMENTS

CN 1930737 A * 3/2007 ........... G01R 1/0416
CN 201233990 Y 5/2009
(Continued)

OTHER PUBLICATIONS

European Patent Application No. 19889641.7, European Search Report, dated Jul. 5, 2022; 12 pages; European Patent Office.
(Continued)

*Primary Examiner* — Peter G Leigh
(74) *Attorney, Agent, or Firm* — Tamika A. Crawl-Bey

(57) ABSTRACT

A compressible electrical contact, manufactured from a tube, includes a first contact end, a second contact end opposing the first contact end, and a medial portion disposed between the first contact end and the second contact end. The medial portion includes a plurality of divaricated cut sections based on at least one divaricating pattern cut into the tube. The at least one divaricating pattern preferably includes an upper tapered section and a lower tapered section such that a plurality of tapered slots are formed after the tube is cut and when the compressible electrical contact is substantially compressed.

20 Claims, 16 Drawing Sheets

Related U.S. Application Data

(60) Provisional application No. 62/903,499, filed on Sep. 20, 2019, provisional application No. 62/773,281, filed on Nov. 30, 2018.

(51) Int. Cl.
  *H01R 24/50* (2011.01)
  *H01R 43/16* (2006.01)
  *H01R 103/00* (2006.01)

(58) Field of Classification Search
  USPC .......................................................... 439/66
  See application file for complete search history.

(56) References Cited

U.S. PATENT DOCUMENTS

| | | | |
|---|---|---|---|
| 5,062,619 A * | 11/1991 | Sato | F16F 1/02 267/273 |
| 5,189,364 A | 2/1993 | Kazama | |
| D404,363 S | 1/1999 | Pyle | |
| 5,982,187 A | 11/1999 | Tarzwell | |
| 6,337,142 B2 * | 1/2002 | Harder | A61B 17/1631 428/596 |
| D474,740 S | 5/2003 | Abbott | |
| 6,720,511 B2 | 4/2004 | Windebank | |
| 7,014,473 B2 | 3/2006 | Millard et al. | |
| 7,175,112 B2 * | 2/2007 | Uhlmann | F02M 47/027 267/152 |
| 7,491,069 B1 | 2/2009 | Di Stefano et al. | |
| 7,938,680 B1 | 5/2011 | Chi-Feng | |
| 8,636,529 B2 | 1/2014 | Stein | |
| 9,121,507 B2 | 9/2015 | Ghalambor et al. | |
| 9,435,827 B2 * | 9/2016 | Pak | G01R 3/00 |
| 9,589,710 B2 * | 3/2017 | Stein | H01B 17/58 |
| 2002/0013085 A1 | 1/2002 | Boyle et al. | |
| 2007/0194508 A1 * | 8/2007 | Bucciero | F16F 1/028 267/182 |
| 2007/0197099 A1 | 8/2007 | DiStefano | |
| 2007/0207654 A1 | 9/2007 | Hu | |
| 2007/0269999 A1 | 11/2007 | Di Stefano | |
| 2008/0194124 A1 | 8/2008 | Di Stefano | |
| 2009/0111289 A1 * | 4/2009 | Vinther | H01R 12/714 439/81 |
| 2011/0039448 A1 | 2/2011 | Stein | |
| 2012/0187971 A1 * | 7/2012 | Huang | G01R 1/06722 324/755.05 |
| 2014/0004721 A1 | 1/2014 | Stein | |
| 2014/0329421 A1 | 11/2014 | Schiele et al. | |
| 2015/0276807 A1 | 10/2015 | Chen et al. | |
| 2017/0054264 A1 * | 2/2017 | Ryu | H01R 43/205 |
| 2017/0138985 A1 | 5/2017 | Teranishi et al. | |
| 2017/0222348 A1 * | 8/2017 | Li | H01R 12/714 |
| 2017/0322235 A1 | 11/2017 | Liu et al. | |
| 2018/0076552 A1 * | 3/2018 | Wang | H01R 13/04 |
| 2019/0063537 A1 | 2/2019 | Dawson et al. | |
| 2019/0074610 A1 | 3/2019 | Thakare et al. | |
| 2019/0305455 A1 | 10/2019 | Uppleger | |
| 2020/0203873 A1 | 6/2020 | Wang et al. | |
| 2021/0035701 A1 | 2/2021 | Yamamoto | |

FOREIGN PATENT DOCUMENTS

| | | | |
|---|---|---|---|
| CN | 203103590 U | 7/2013 | |
| DE | 3727241 A1 | 3/1988 | |
| DE | 102010008194 A1 | 8/2011 | |
| FR | 2805868 A1 | 9/2001 | |
| GB | 2366605 A * | 3/2002 | A63B 21/02 |
| JP | H08159195 A * | 6/1996 | F16D 3/74 |
| JP | 2006153723 A * | 6/2006 | |
| JP | 2011169595 A * | 9/2011 | |
| JP | 2016166783 A * | 9/2016 | |
| WO | 2020/112474 A1 | 6/2020 | |

OTHER PUBLICATIONS

International Search Report and Written Opinion of the International Searching Authority; PCT/US2020/024850; dated Jun. 24, 2020; 10 pages.

Electrical contacts. (Design—(Copyrights) Questel) orbit.com. [Online PDF compilation of references selected by examiner] 11 pgs. Print Dates Range Jul. 3, 2015-May 24, 2017 [Retrieved Feb. 23, 2021] https://www.orbit.com/export/UCZAH96B/pdf4/2337c902-fff4-42f2-aef3- b9ca7ff304ee-213245.pdf (Year: 2021).

International Search Report and Written Opinion of the International Searching Authority; PCT/US2019/062537; dated Feb. 7, 2020; 9 Pages; Commissioner for Patents.

International Search Report and Written Opinion of the International Searching Authority; PCT/US2020/058460; dated Apr. 14, 2021, 23 pages; European Patent Office.

* cited by examiner

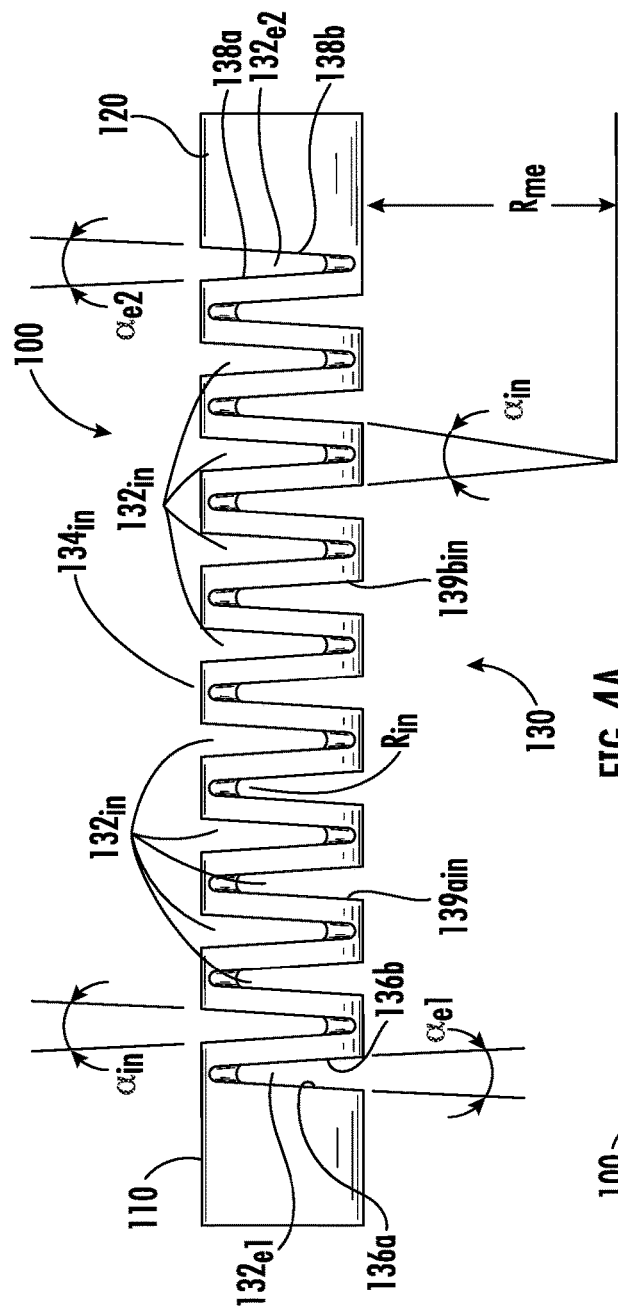
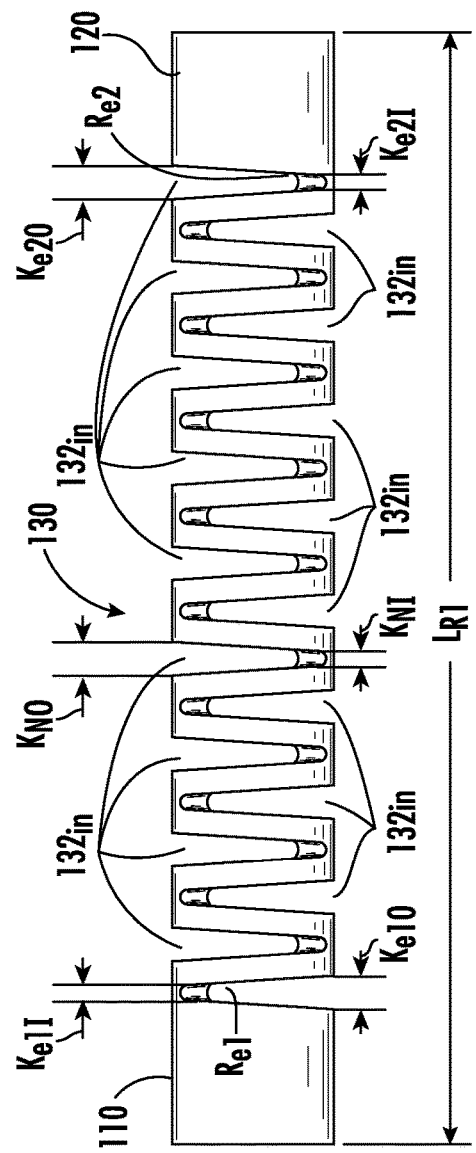
FIG. 4A
FIG. 4B

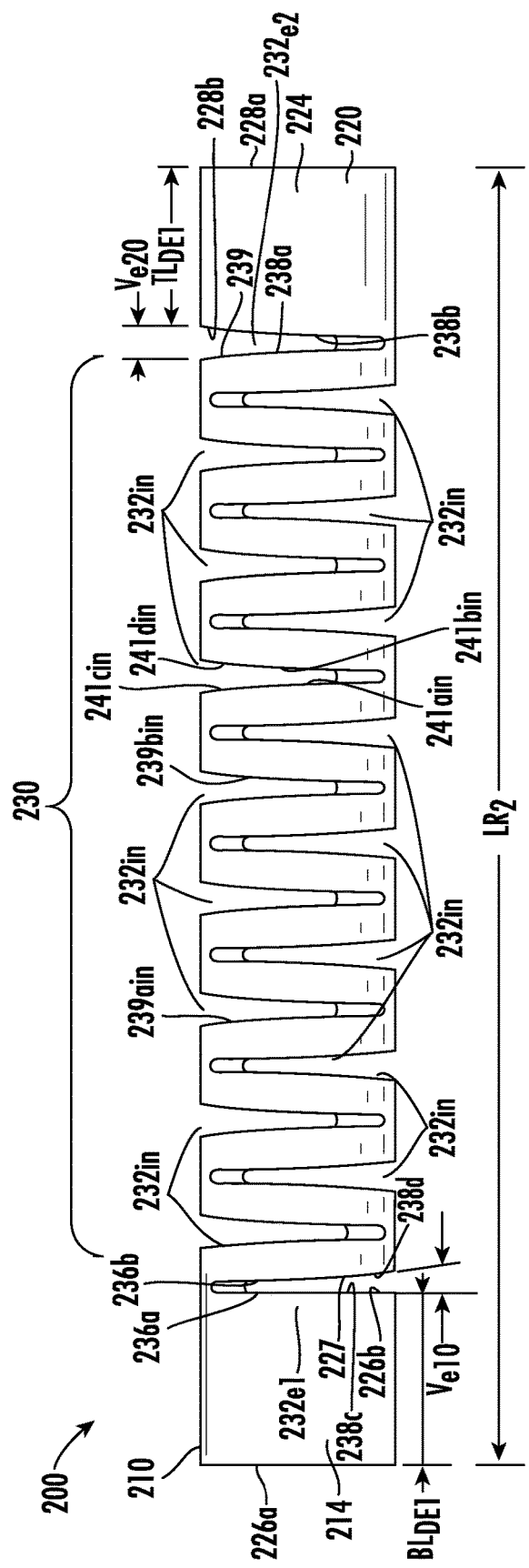
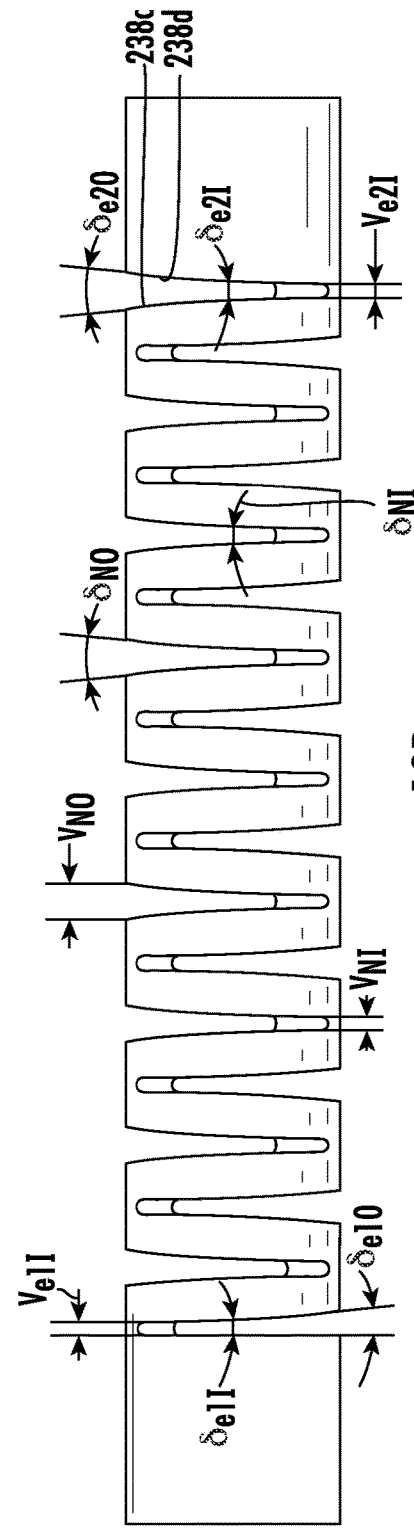
FIG. 10A
FIG. 10B

COMPRESSIBLE ELECTRICAL CONTACTS WITH DIVARICATED-CUT SECTIONS

CROSS-REFERENCE TO RELATED APPLICATIONS

This application is a continuation of International Application No. PCT/US2019/062537, filed Nov. 21, 2019, which claims the benefit of priority to U.S. Provisional Application Ser. No. 62/903,499, filed Sep. 20, 2019, and U.S. Provisional Application Ser. No. 62/773,281, filed Nov. 30, 2018. The contents of each priority application are relied upon and incorporated herein by reference in their entireties.

BACKGROUND

The present disclosure generally relates to compressible electrical contacts or electrical interconnects, having divaricated-cut sections, and connector assemblies, including compressible electrical contacts or electrical interconnects, having divaricated-cut sections.

Electrical contacts, interconnects, and connectors are used to attach cables and other devices which carry and process electrical signals. This industry, however, continuously demands and strives to build systems that are smaller, denser, and lighter. Because of design constraints, some contacts, interconnects, and connectors are unable to meet new industry requirements, particularly with respect to size limitations.

For example, the size of male-female electrical connectors can be limited because of the female portion of an electrical connector. In some connector types, the center conductor/contact traditionally has a socket-style that is designed to expand, but maintain electrical connection with a male pin center conductor when mated together during installation. This functionality requires the socket-style center conductor/contact to be larger in diameter than the male pin. This dimensional constraint allows insertion of the male pin into the internal diameter of the socket contact with minimal interference, while maintaining contact and providing a continuous electrical signal.

Another type of technology that can replace the use of socket-style conductors/contacts is a steel wool-like component known industrywide as a FUZZ BUTTON® interconnect. The concept behind this technology is to provide an extremely thin wire that is bundled, formed, and hardened inside a cavity. The steel wool-like material allows the interconnect to be formed into a desired final shape. Upon assembly, the interconnect is squeezed between center conductors of two mating connectors, allowing passage of an electrical signal. Although these types of interconnects are formable, the coily nature of the interconnect is difficult to handle and provides a non-ideal electrical path, which is unacceptable for high performance applications.

Other applications may use a "pogo" pin contact that utilizes an internally mounted coil spring to provide a plunger-type contact action. This arrangement, however, is often too large. In addition, the arrangement has several components, which are can be too many for practical use, particularly for high density microwave applications.

Accordingly, there is a clear need to improve upon existing electrical contacts and interconnects.

SUMMARY

Disclosed herein are compressible electrical contacts, having divaricated-cut sections, which act as flexible intermediary conductors. These compressible electrical contacts facilitate transmission of electrical current along electrical paths. In one embodiment disclosed herein, the electrical path extends along at least two mating conductors, e.g. a center conductor and a cable. The compressible electrical contact is configured to vary its length, compensate for tolerance ranges/deviations of mating center conductors or cables, and maintain constant electrical and mechanical connection upon assembly.

The properties of the compressible electrical contacts disclosed herein are due, in part, to manufacturing the contacts using precision cut ting methods, which result in a plurality of divaricated-cut sections. Such methods include, but are not limited to, laser cut ting, electroforming, and/or electro-etching. Regardless of the precision cut ting method used, the contacts disclosed herein are preferable designed, using divaricating patterns, such that each contact has a plurality of divaricated-cut sections in its final form. The term "divaricating pattern", as used herein, is defined as a cut ting pattern that allows the compressible electrical contact to have contact sections configured to have open tapered areas that extend outwardly after cut ting when in a substantially relaxed state, nest or collapse inwardly to form tapered slots when compressive force is applied to ends of the compressible electrical contact, resulting in a substantially compressed state, and maintain a flexible and substantially tubular form when transitioning from a substantially relaxed state to a substantially compressed state, despite the presence of the plurality of divaricated-cut sections.

In one preferred embodiment, the compressible electrical contacts are manufactured by laser cut ting, using substantially rigid tubing. The rigidity of the tubing and the divaricating pattern of the compressible electrical contact are such that after cut ting, the compressible electrical contact maintains a consistent shape without the need for either inner or outer support structures, even though each contact has divaricated-cut sections.

In accordance with one aspect, the present disclosure is directed toward a compressible electrical contact, including a first contact end, a second contact end opposing the first contact end, and a medial portion disposed between the first contact end and the second contact end. The medial portion includes a plurality of divaricated-cut sections based on at least one divaricating pattern cut into the tube. The at least one divaricating pattern preferably includes an upper tapered section and a lower tapered section such that a plurality of tapered slots are formed after the tube is cut when the compressible electrical contact is substantially compressed.

In accordance with another aspect, the present disclosure is directed toward a compressible electrical contact, including a body having a plurality of divaricated-cut sections, wherein each divaricated-cut section is defined by a cut angle such that the length of the tube is variable, and wherein the body forms a plurality of tapered interior open spaces when the body is compressed. As such, the contact can be formed without contact ends or alternatively with one contact end.

In accordance with another aspect, a compressible electrical contact includes a first contact end, a second contact end opposing the first contact end, and a medial portion disposed between the first contact end and the second contact end. The medial portion includes a plurality of divaricated-cut sections based on at least one divaricating pattern cut into the tube. The at least one divaricating pattern preferably includes an upper tapered section, a lower tapered section, and an arc section such that a plurality of tapered slots are formed after the tube is cut when the compressible electrical contact is substantially compressed.

In accordance with yet another aspect, the present disclosure is directed toward a method of cut ting a tube to form a compressible electrical contact. The method includes the steps of cut ting the tube with respect to a latitudinal plane parallel to a first central axis of the tube in a divaricating pattern that forms divaricated-cut sections between a first contact end and a second contact end. Alternatively, or in addition, the method can further include one or more steps of cut ting the tube in a divaricating pattern with respect to a second plane parallel to a second central axis of the tube, with the second central axis being perpendicular to the first central axis.

BRIEF DESCRIPTION OF THE DRAWINGS

FIGS. 4A and 4B show two top views of the compressible electrical contact shown in FIG. 1 with the compressible electrical contact being in a substantially relaxed state.

FIGS. 10A and 10B are top views of another compressible electrical contact in accordance with embodiments disclosed herein, shown in a substantially relaxed state.

Figure 1:
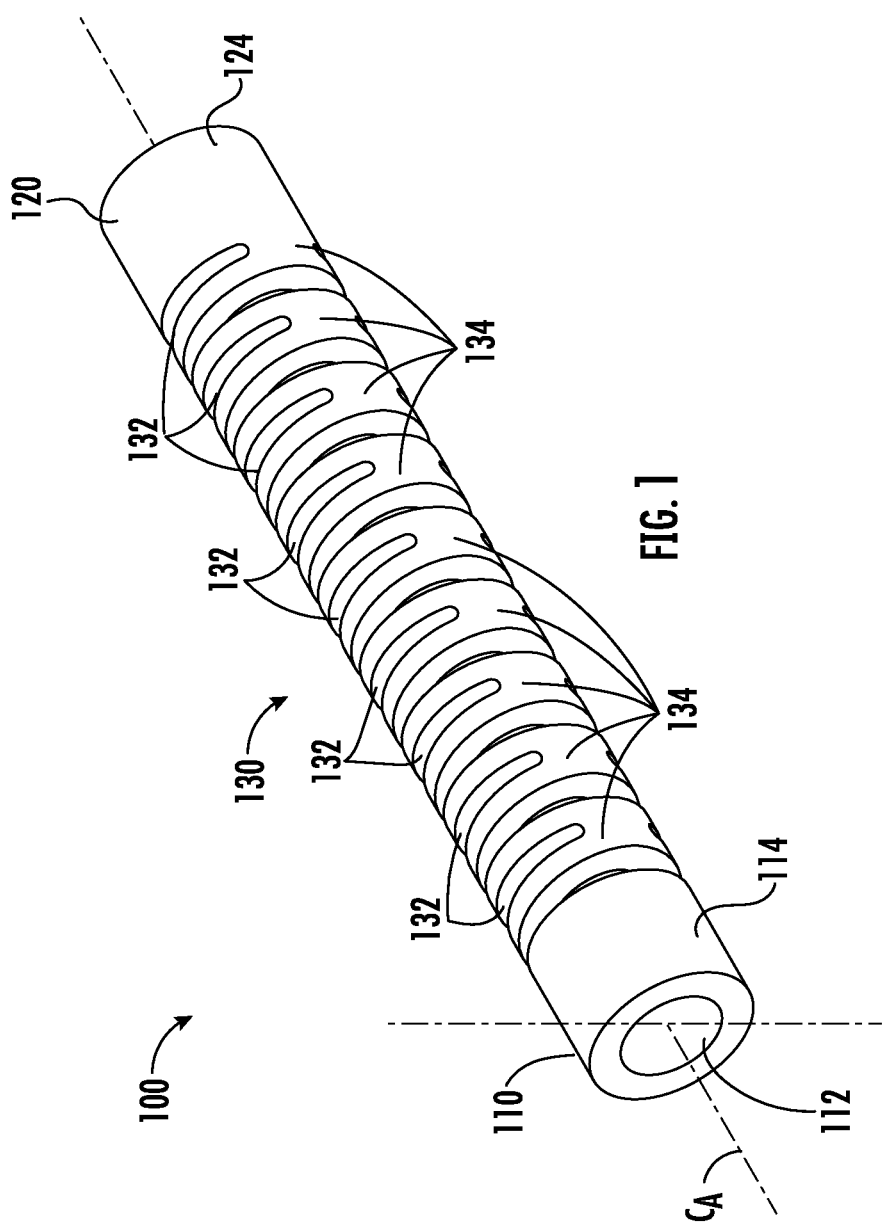
FIG. 1 is an isometric view of a compressible electrical contact in a substantially relaxed state in accordance with embodiments disclosed herein.

It is to be understood that both the foregoing general description and the following detailed description are merely exemplary and intended to provide an overview or framework to understanding the nature and character of the claims. The accompanying drawings are included to provide a further understanding, and are incorporated in and constitute a part of this specification. The drawings illustrate one or more embodiments, and together with the description explain the principles and operation of the various embodiments.

DETAILED DESCRIPTION

In the following detailed description, reference is made to the accompanying drawings, which form a part hereof. In the drawings, similar symbols may be used to identify similar components, unless context dictates otherwise.

Moreover, the illustrative embodiments described in the detailed description, drawings, and claims are not meant to be limiting. Other embodiments may be utilized, and other changes may be made, without departing from the spirit or scope of the subject matter presented herein.

Also, it will be readily understood that the aspects of the present disclosure, as generally described herein, and illustrated in the various accompanying figures, can be arranged, substituted, combined, separated, and designed in a wide variety of different configurations, all of which are explicitly contemplated herein. It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present.

It will be further understood that, although the terms "first", "second", etc. may be used herein to describe various elements, components, etc., these elements, components, etc. should not be limited by these terms. These terms are only used to distinguish one element, component, etc. from another element, component, etc. Thus, a "first" element or component discussed below could also be termed a "second" element or component without departing from the teachings disclosed herein. In addition, the sequence of operations (or steps) is not limited to the order presented in the claims unless specifically indicated otherwise.

FIGS. 1-8 show various views of a compressible electrical contact 100 in accordance with embodiments disclosed herein. FIG. 1 is an isometric view of the compressible electrical contact 100 in a substantially relaxed state. The compressible electrical contact 100 includes a first contact end 110, a second contact end 120 opposing the first contact end 110, and a medial portion 130 disposed between the first contact end 110 and the second contact end 120. The first contact end 110 includes an inner surface 112 and an outer surface 114. Similarly, the second contact end 120 includes an inner surface 122 (FIG. 2) and an outer surface 124.

Figure 5:
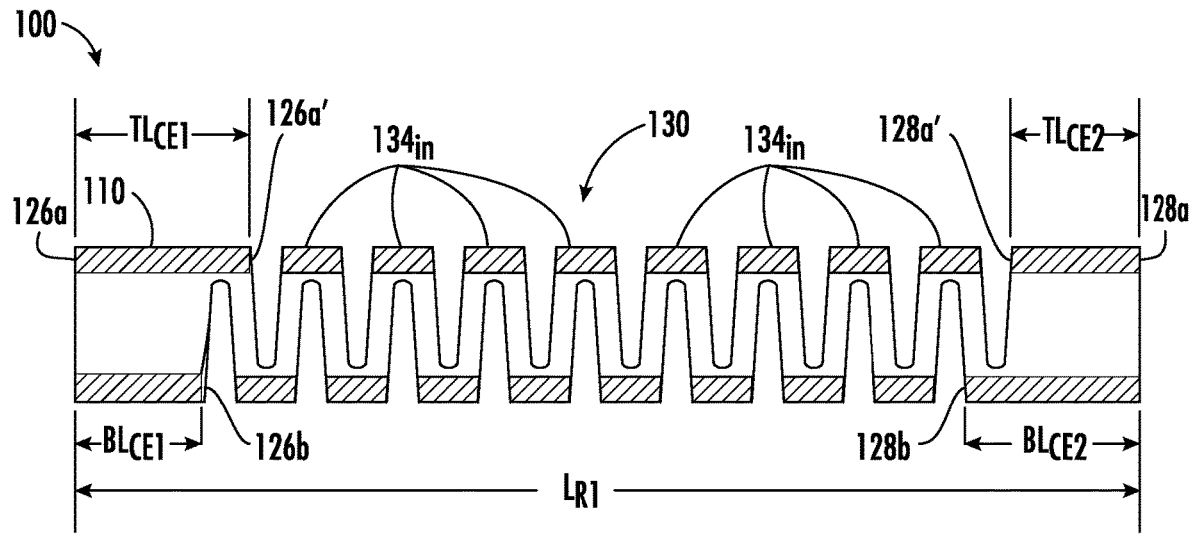
FIG. 5 is a cross-sectioned top view of the compressible electrical contact shown in FIG. 1 taken along a centrally located latitudinal plane with respect to inner and outer diameters of the compressible electrical contact.
Figure 6:
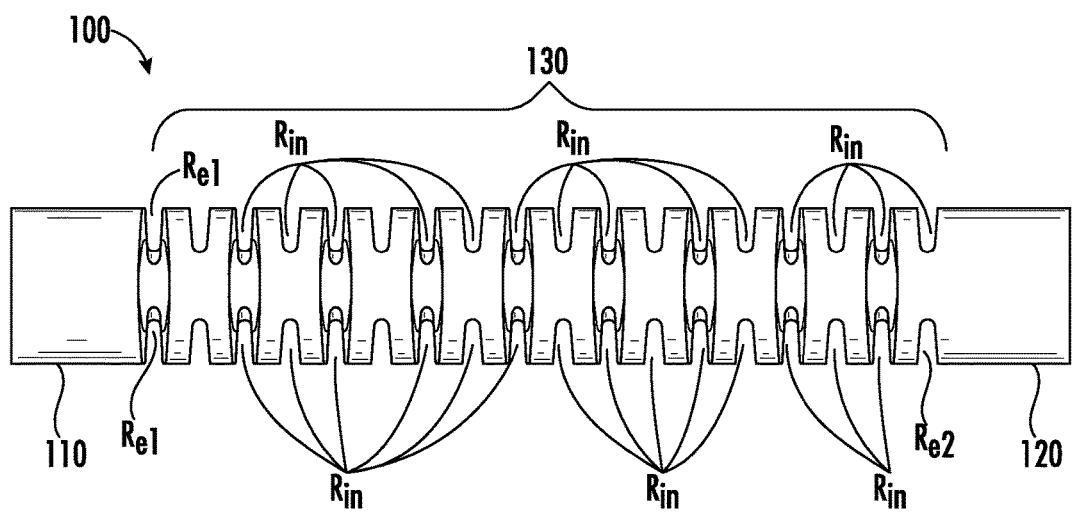
FIG. 6 is a side view of the compressible electrical contact shown in FIG. 1 in a substantially relaxed state.
Figure 7:
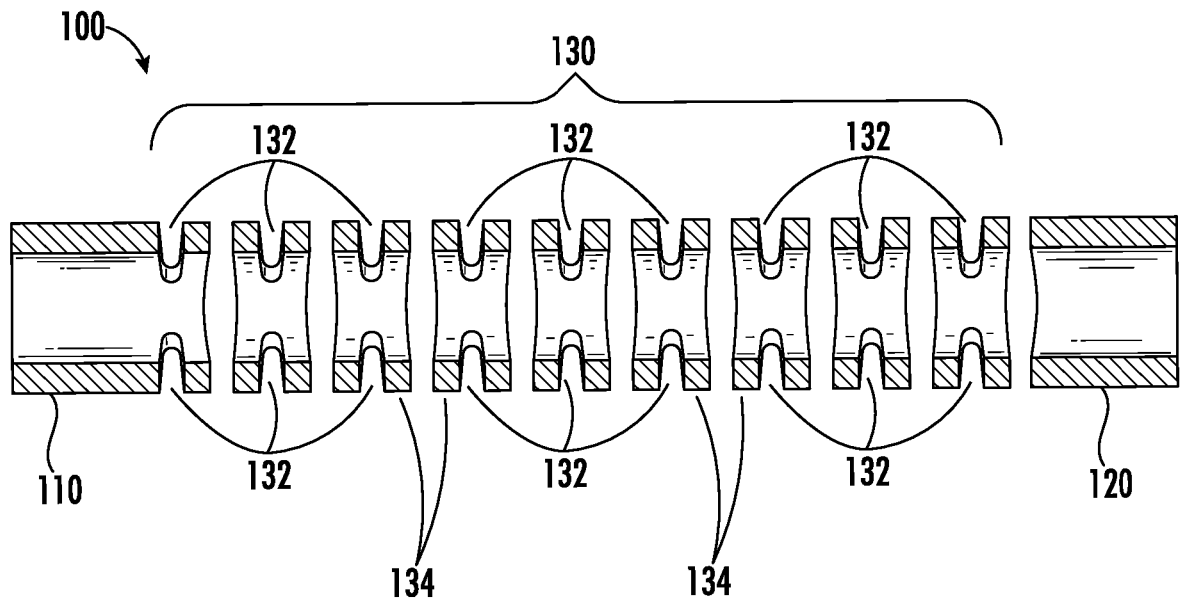
FIG. 7 is a cross-sectioned side view of the compressible electrical contact shown in FIG. 1 taken along a centrally located longitudinal plane with respect to inner and outer diameters of the compressible electrical contact shown in FIG. 1.

As shown particularly in FIG. 5, in the substantially relaxed state, the compressible electrical contact 100 has a relaxed length defined as $L_{R1}$, measured from a first outer edge 126a to an opposing outer edge 128a. Each contact end 110, 120 is also defined, in part, by top lengths $TL_{CE1}$, $TL_{CE2}$ and bottom lengths, $BL_{CE1}$, $BL_{CE2}$, as particularly shown in FIG. 5. Top length $TL_{CE1}$ is measured from the first outer edge 126a to a first top inner edge 126a' of the contact 100, while top length $TL_{CE2}$ is measured from the second outer edge 128a to a second top inner edge 128a' of the contact 100. Bottom length $BL_{CE1}$ is measured from the first outer edge 126a to a first bottom inner edge 126b, while bottom length $BL_{CE2}$ is measured from the second outer edge 128a to a second bottom inner edge 128b. In preferred configurations, at least a portion of each contact end 110, 120 is cylindrical.

Figure 2:
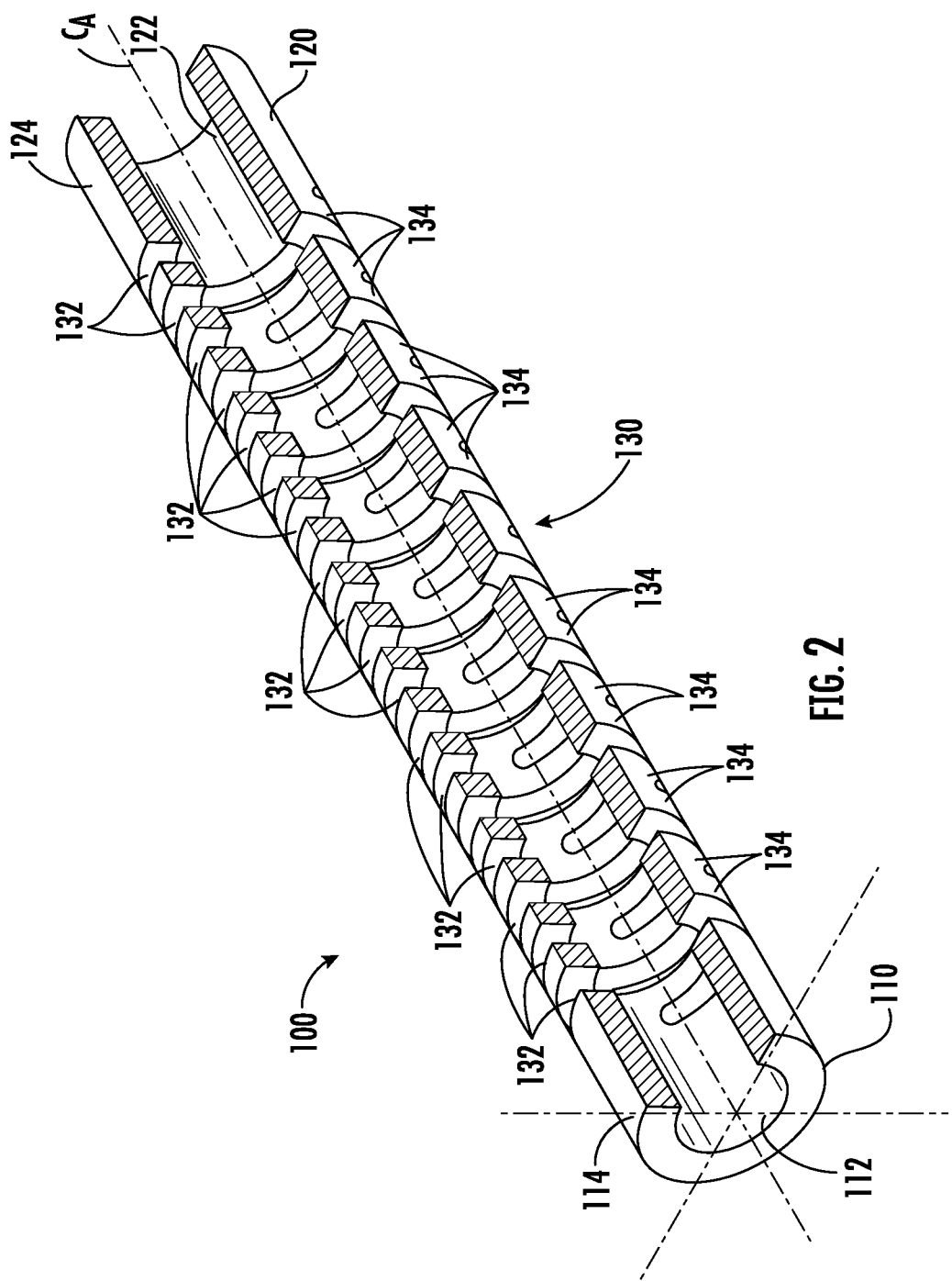
FIG. 2 is an isometric view of the compressible electrical contact shown in FIG. 1 with an upper quadrant of the contact removed.
Figure 3:
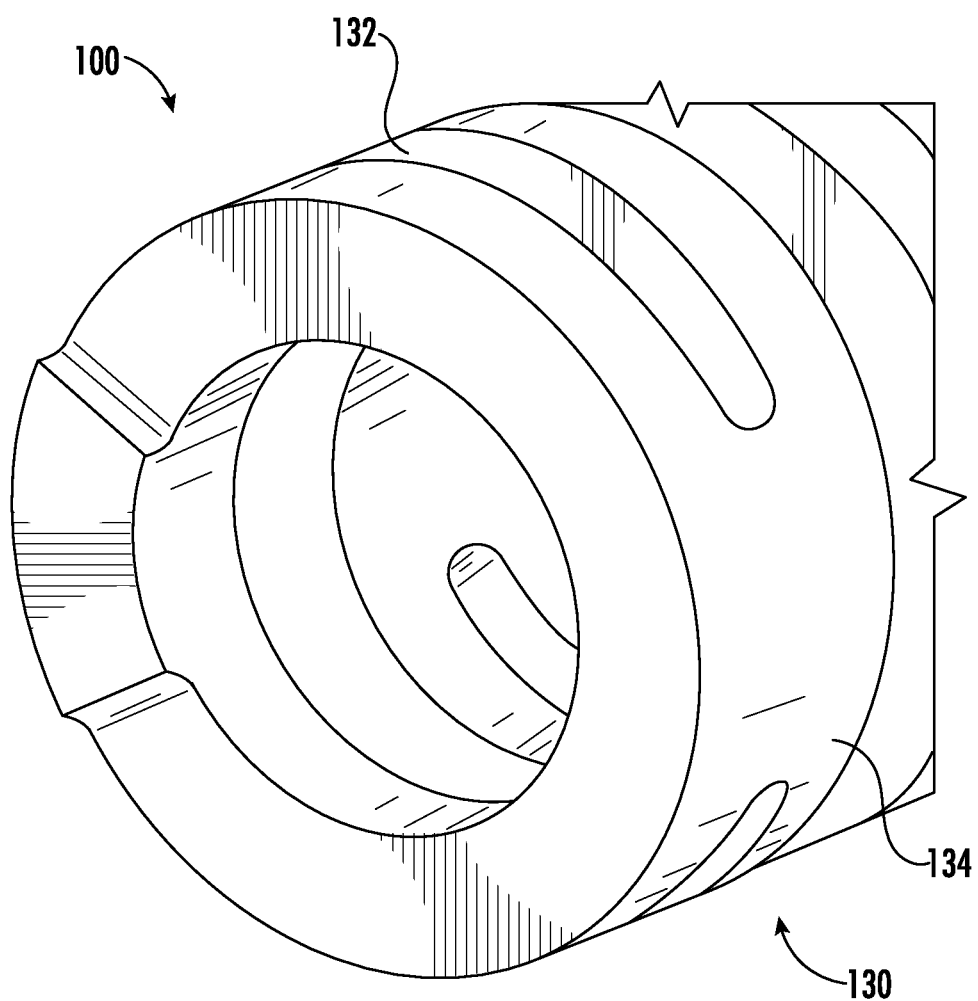
FIG. 3 is an enlarged cut away portion of the medial section of the compressible electrical contact shown in FIG. 1.

Referring particularly to FIGS. 1-5, the medial portion 130 includes a plurality of divaricated-cut sections 132 with medial elements 134 adjacent to or therebetween. For further illustration, FIG. 2 shows an isometric view of the compressible electrical contact 100 in a substantially relaxed state with its upper right quadrant removed and FIG. 3 shows an enlarged section of the medial portion 130 cut away from the first contact end 110. In alternative configurations, the compressible electrical contact can include a body without the first and second contact ends.

FIGS. 1-7 also show various views of the compressible electrical contact 100 in a substantially relaxed state, manufactured according to a divaricating pattern PA (FIG. 9) that defines how the plurality of divaricated-cut sections 132 are cut into a tube 300A. Referring particularly to FIG. 4, from the first contact end 110, an initial divaricated cut $132_{e1}$ (referring to the first divaricated cut on the first contact end 110) may be defined by a first end cut angle $\alpha e1$, which is measured with respect to opposing inner surfaces 136a, 136b. From the second contact end 120, a final divaricated cut $132_{e2}$ (referring to the last divaricated cut on the second contact end 120) may be defined by a second end cut angle $\alpha_{e2}$, which is measured with respect to opposing inner surfaces 138a, 138b. Inner divaricated-cut sections $132_{in}$, positioned between the first contact end 110 and the second contact end 120, may be defined by an inner cut angle $\alpha_{in}$ (referring to a plurality of inner divaricated cut angles between the first contact end 110 and the second contact end 120). Each inner cut angle $\alpha$ in is measured with respect to outwardly extending opposing inner surfaces $139_{ain}$, $139_{bin}$, between inner divaricated cut-sections $132_{in}$. In addition, preferably included in each divaricated-cut section is a radiused edge $R_{e1}$, $R_{in}$, $R_{e2}$ disposed between the respective opposing inner surfaces $139_{ain}$, $139_{bin}$. Each of the divaricated-cut sections can be further defined with respect to innermost cut distances $K_{e1I}$, $K_{NI}$, $Ke_{2I}$ and outermost cut distances $K_{e1O}$, $K_{NO}$, $K_{e2O}$, where each innermost cut distance is smaller than each outermost cut distance.

Although a certain number of sections and medial elements are shown in FIGS. 1-8, the number of divaricated-cut sections and medial elements shown should not be construed as limiting. Fewer or additional divaricated-cut sections and medial elements may be included within the overall structure of the compressible electrical contacts disclosed herein. Moreover, the angles of the divaricated-cut sections and the widths of the medial elements may vary.

Figure 8:
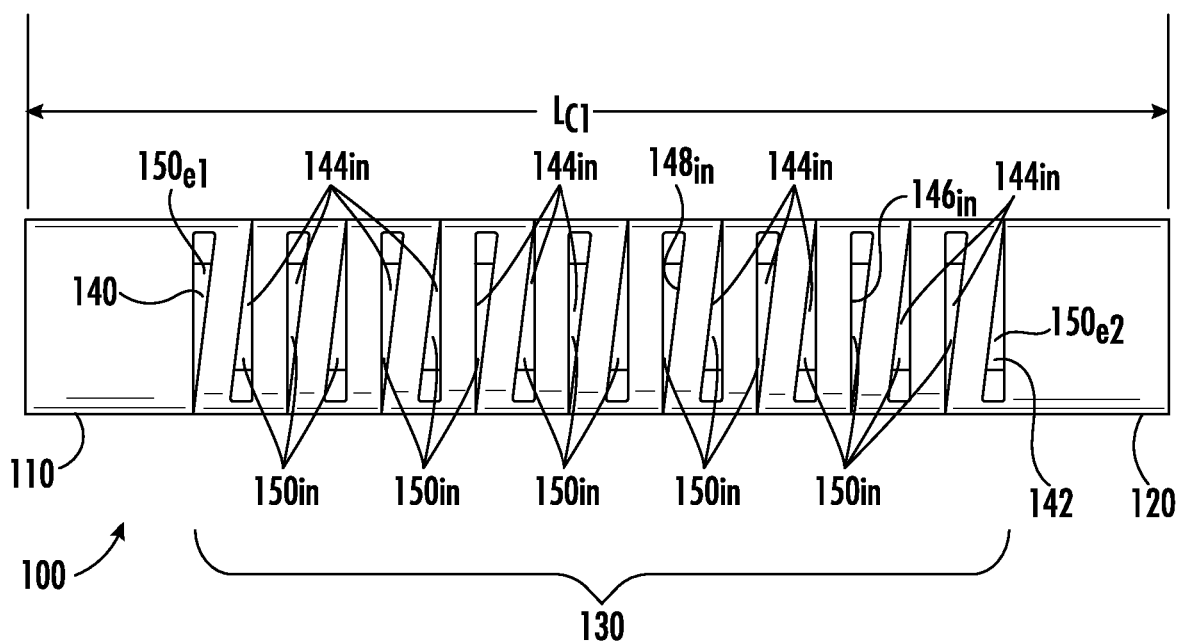
FIG. 8 is a top view of the compressible electrical contact shown in FIG. 1 in a substantially compressed state.

FIG. 8 shows the compressible electrical contact 100, in a substantially compressed state, at a compressed length $L_{C1}$, where $L_{C1}$ is measured from the first outer edge 126a to the second outer edge 128a of the contact 100 when the contact 100 is substantially compressed. In this state, the inner surfaces 136a, 136b (FIG. 4) nest or collapse inwardly and contact each other such that a first end space 140 is formed adjacent the first contact end 110. Also, inner surfaces 138a, 138b (FIG. 4) nest or collapse inwardly and are in contact such that a second end space 142 is formed adjacent to the second contact end 120. And, inner surfaces $139_{ain}$, $139_{bin}$ (FIG. 4) nest or collapse inwardly such that the compressible electrical contact 100 also includes interior spaces $144_{in}$ formed between interior surfaces $139_{ain}$, $139_{bin}$ (FIG. 4). Accordingly, in the substantially compressed state, a portion of each inner surface touches such that the end spaces and interior spaces form a plurality of tapered slots $150_{e1}$ (first contact end slot), $150_{in}$ (inner contact slots), $150_{e2}$ (second contact end slot) that extends through the compressible electrical contact 100. The plurality of slots 150 can be further defined to have a tapered-teardrop shape upon compression.

In the substantially compressed state, shown in FIG. 8, the compressible electrical contact 100 also remains in a substantially tubular shape without the need for inner and/or outer diameter support structures. The ability of the compressible electrical contact 100 to maintain a relatively tubular shape is in marked contrast to the jumbled and serpentine undulations commonly seen in coil-type springs when compressed without inner and/or outer diameter support structures. As a result, the medial elements 134 (FIG. 7) act to counter-balance each other throughout a compression stroke, spreading the load of the forces exerted onto the contact across substantially all portions of the contact 100.

Figure 9:
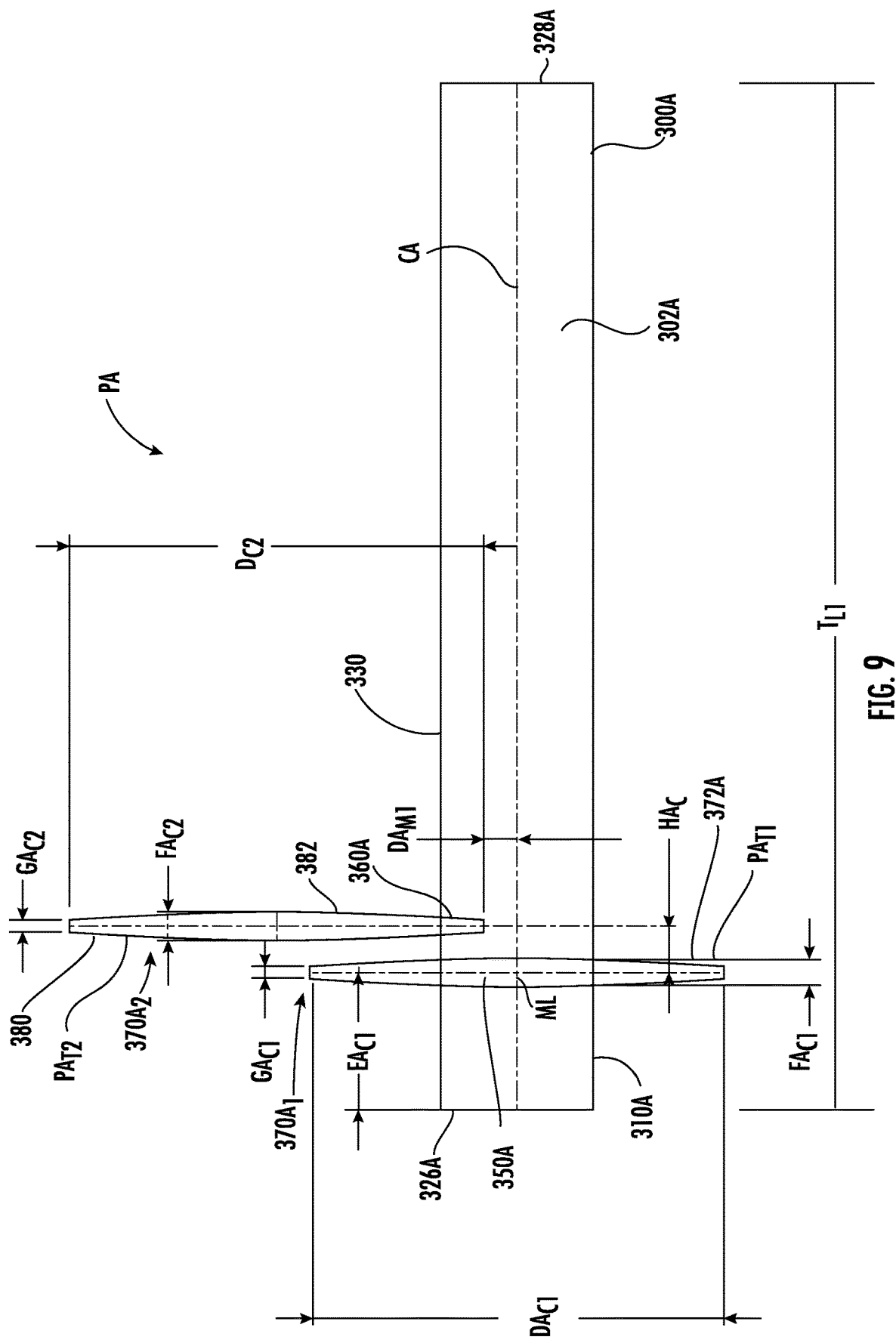
FIG. 9 is a side view of a tube, schematically illustrating a divaricating pattern for the compressible electrical contact, shown in FIGS. 1-8, in accordance with embodiments disclosed herein.

FIG. 9 illustrates an exemplary divaricating pattern PA for a tube 300A. The tube 300A includes an outer surface 302a and an inner surface (not shown), an overall tube length $T_{L1}$, a first tube edge 326A, and a second tube edge 328A. The tube is shown, as being substantially cylindrical. However the tube, may have other outer configurations, including, but not limited to square, hexagonal, and other polygonal tube configurations. The divaricating pattern PA is defined with respect to a central axis CA along the length of the tube 300A. A theoretical divaricated cut 350A1 for a tube end 310A may be defined with respect to a first divaricating pattern $PA_{T1}$, using predefined measurements $DA_{C1}$, $EA_{C1}$, $FA_{C1}$, and $GA_{C1}$. The first divaricating pattern $PA_{T1}$ includes an upper tapered section $370_{A1}$ and a lower tapered section $372_{A1}$. The lowered tapered section $372_{A1}$ preferably mirrors and is positioned directly below the upper tapered section $370_{A1}$.

$DA_{C1}$ measures the overall height of the first theoretical divaricated cut 350A. $EA_{C1}$ measures the distance of the center of the divaricating pattern $PA_{T1}$ from the first outer edge 326A of the tube 300A. $FA_{C1}$ is the widest width of the divaricating pattern $PA_{T1}$ and $GA_{C1}$ is narrowest width of the divaricating pattern $PA_{T1}$.

A theoretical divaricating cut 360A for a tube medial portion 330A may be defined with respect to a second divaricating pattern $PA_{T2}$, using predefined measurements $DA_{C2}$, $FA_{C2}$, and $GA_{C2}$. $DA_{C2}$ measures the overall height of the theoretical divaricated cut 360A. $FA_{C2}$ is the widest width of the divaricating pattern $PA_{T2}$ and $GA_{C2}$ is narrowest width of the divaricating pattern $PA_{T2}$. The divaricating patterns $PA_{T1}$, $PA_{T2}$ are further defined with respect to dimensions HAc, DAm, where HAc is the distance between the patterns $PA_{T1}$, $PA_{T2}$ measured from their respective centerlines and $DA_{M1}$ is the distance from the bottom of divaricating pattern $PA_{T2}$ to a middle line ML where the tapered sections $370_{A1}$, $372_{A1}$ join, with the line being central axis CA.

The theoretical divaricating cut s are further defined with respect to each other at a measurement HAc defined with respect to the centerlines of theoretical end cut 350A and theoretical medial cut 360A. Preferably, the divaricating patterns are such that they allow the final form of the divaricated-cut compressible electrical contact to exhibit spring-like properties. Moreover, in the embodiments disclosed herein, zig-zag-like tapered patterns are preferred such that the final properties of the contact are spring-like. The divaricating pattern PA is also configured such that the amount of bowing that could occur in the medial portion, after cutting of the tube and during compression is minimal. Alternative variations and divaricating patterns may, however, be used.

Figure 11:
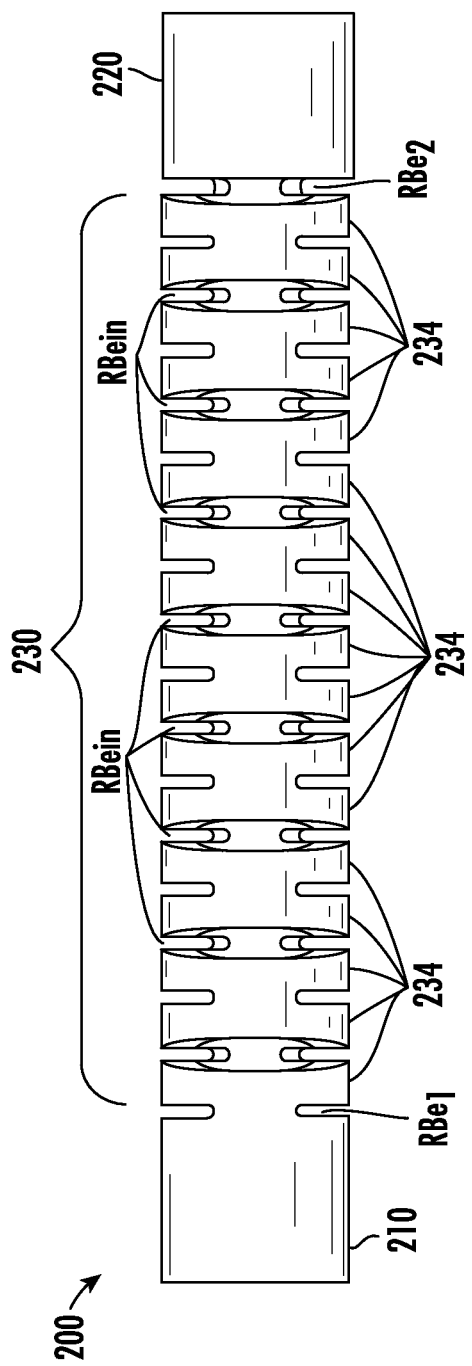
FIG. 11 is a side view of the compressible electrical contact shown in FIGS. 10A and 10B.
Figure 12:
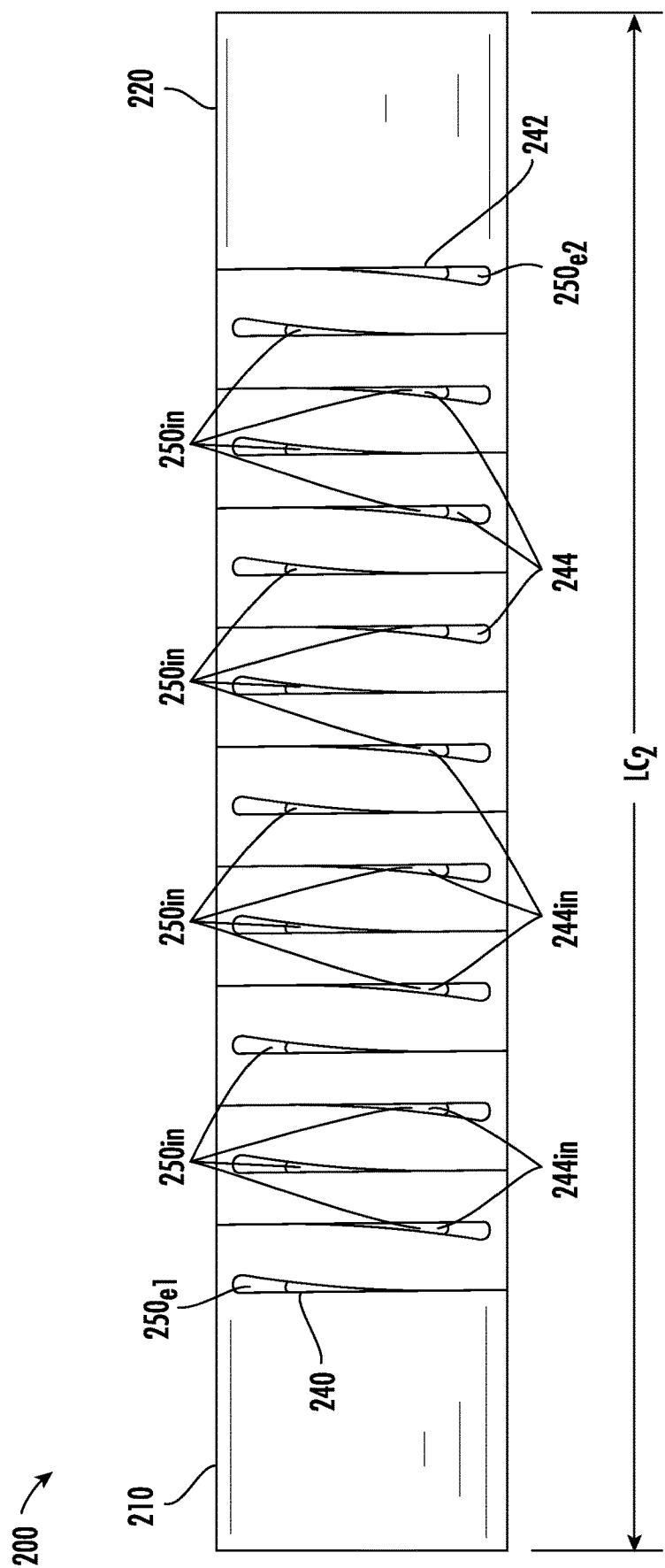
FIG. 12 is a top view of the compressible electrical contact shown in FIGS. 10A and 10B in a substantially compressed state.

FIGS. 10-12 show various views of a compressible electrical contact 200 in accordance with embodiments disclosed herein. FIGS. 10A and 10B show top views of the contact 200 and FIG. 11 shows a side view of the contact 200 in a substantially relaxed state. The compressible electrical contact 200 includes a first contact end 210, a second contact end 220 opposite the first contact end 210, and a medial portion 230 disposed between the first contact end 210 and the second contact end 220. The first contact end 210 includes an inner surface (not shown) and an outer surface 214. Similarly, the second contact end 220 includes an inner surface (not shown) and an outer surface 224. In preferred configurations, at least a portion of each contact end 210, 220 is cylindrical.

In the substantially relaxed state, shown in FIGS. 10 and 11, the compressible electrical contact 200 has a relaxed length defined as $L_{R2}$, measured from a first outer edge 226a to an opposing outer edge 228a. Contact end 210 is defined, in part, by a bottom length, $BL_{DE1}$ measured from the outer edge 226a to a bottom inner edge 226b. Contact end 220 is defined, in part, by a top length, $TL_{DE1}$ measured from the outer edge 228a to a first top inner edge 228b.

The medial portion 230 includes a plurality of divaricated-cut sections 232 with medial elements 234 adjacent to or therebetween. As with the first embodiment, the compressible electrical contact 200 can include just a medial portion without the first and second contact ends.

Referring particularly to FIGS. 10A and 10B, from the first contact end 210, an initial divaricated cut $232_{e1}$ (referring to the first divaricated cut on the first contact end 210) may be defined by angles $\delta_{e1I}$, $\delta_{e1O}$, which are measured with respect to opposing inner surfaces 236a, 236b, 236c, 236d. Extending from inner surface 236b is an initial curved surface 237. From the second contact end 220, a final divaricated cut $232_{e2}$ (referring to the last divaricated cut on the second contact end 220) may be defined by angles $\delta_{e2I}$, $S_{e2O}$, which are measured with respect to opposing inner surfaces 238a, 238b, 238c, 238d. Extending from inner surface 238a is an final curved surface 239. Inner divaricated-cut sections $232_{in}$ (referring to a plurality of inner divaricated-cut sections between the first contact end 210 and the second contact end 220) may be defined by two angles $\delta_{NI}$, $\delta_{NO}$ (referring to a plurality of innermost and outermist inner divaricated cut angles between the first contact end 210 and the second contact end 220). Angles $\delta_{NI}$, $\delta_{NO}$ are measured with respect to outwardly extending pairs of opposing inner surfaces $241_{ain}$, $241_{bin}$, $241_{cin}$, $241_{din}$ located between inner divaricated cut-sections $232_{in}$. Each of the divaricated-cut sections can be further defined with respect to innermost cut distances $V_{e1I}$, $V_{NI}$, $V_{e2I}$ and outermost cut distances $V_{e1O}$, $V_{NO}$, $V_{e2O}$, where each innermost cut distance is smaller than each outermost cut distance.

where each innermost cut distance is smaller than each outermost cut distance. In addition, preferably included in each divaricated-cut section is a radiused edge $RB_{e1}$, $RB_{in}$, $RB_{e2}$ (FIG. 11) disposed between the respective opposing inner surfaces $241_{ain}$, $241_{bin}$. and opposing inner curved surfaces $243_{ain}$, $243_{bin}$.

FIG. 12 shows the compressible electrical contact 200 in a substantially compressed state at a compressed length $L_{C2}$, measured from the first outer edge 226a to the second outer edge 228a of the contact 200 when the contact is substantially compressed. In this state, the inner surfaces 236a, 236b nest or collapse inwardly and contact each other such that a first end space 240 is formed adjacent the first contact end 210. Also, inner surfaces 238a, 238b collapse inwardly and are in contact such that a second end space 242 is formed adjacent to the second contact end 220. And, inner surfaces $239_{ain}$, $239_{bin}$ collapse inwardly such that the compressible electrical contact 200 also includes interior spaces $244_{in}$ formed between interior surfaces $246_{in}$, $248_{in}$. In the substantially compressed state, a portion of each inner surface touches such that the end spaces and interior spaces form a plurality of tapered slots 250. The plurality of tapered slots 250 can be further described to include a first contact end slot $250_{e1}$, at least one inner contact slot $250_{in}$, and a second contact end slot $250_{e2}$ that extends through the compressible electrical contact 200. The plurality of slots 250 can be further defined to have a tapered-teardrop shape upon compression. Due to the curved surfaces, however, the slots 250 are much smaller and narrower compared to the slots 150 in the first embodiment of the compressible electrical contact.

In the substantially compressed state, shown in FIG. 12, the compressible electrical contact 200 remains in substantially tubular without the need for inner and/or outer diameter support structures. As with the first embodiment, the medial elements 234 (FIG. 11) act to counter-balance each other throughout a compression stroke, spreading the load of the forces exerted onto the contact across all portions of the contact 200.

Figure 13:
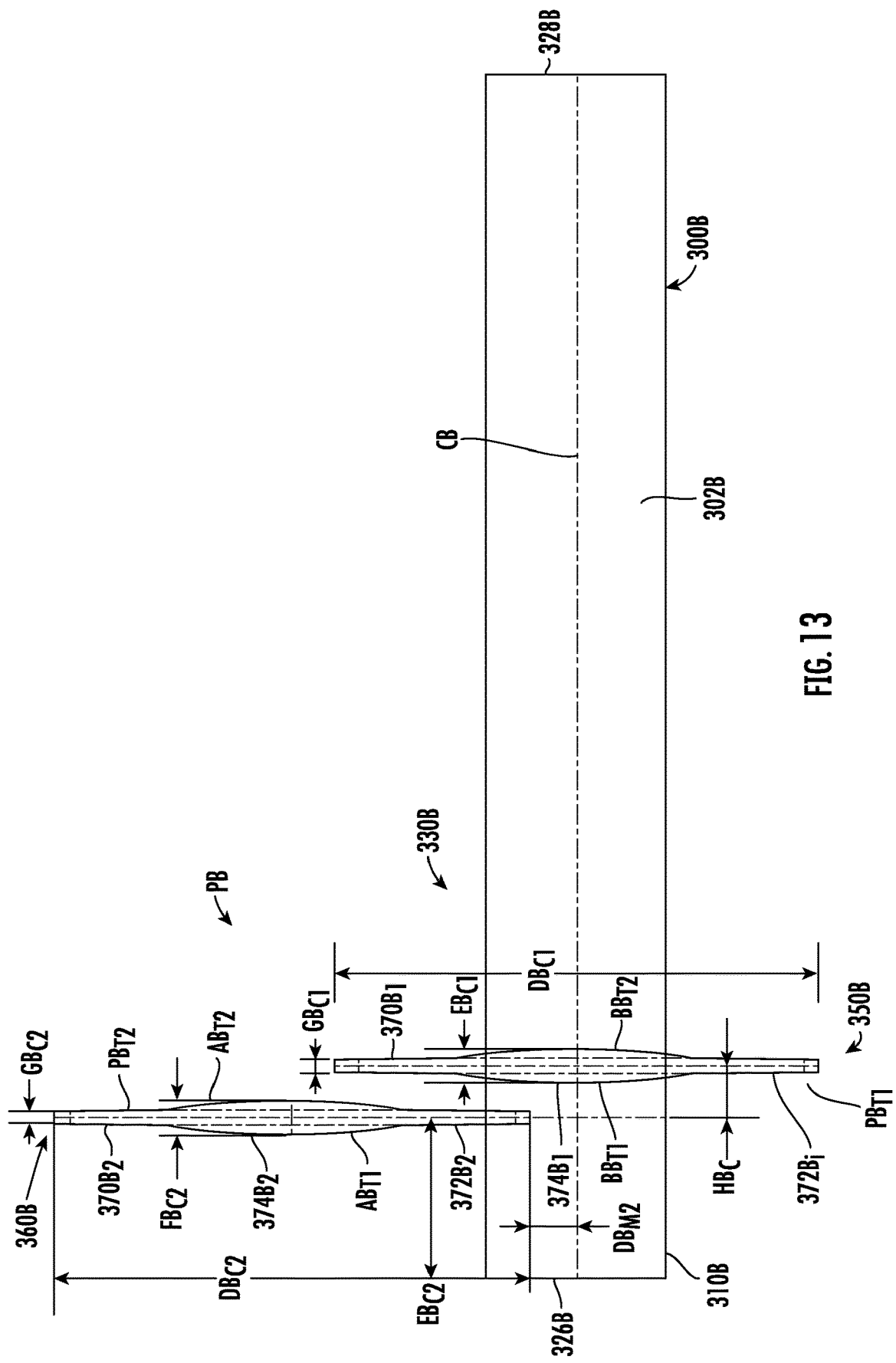
FIG. 13 is a side view of a tube, schematically illustrating a divaricating pattern for the compressible electrical contact, shown in FIGS. 10A-12, in accordance with embodiments disclosed herein.

FIG. 13 shows another type of divaricating pattern PB, including a plurality of divaricating-cut patterns, that may be used to cut the plurality of divaricated-cut sections 232 into a tube 300B. The tube 300B includes an outer surface 302B and an inner surface (not shown), an overall tube length $T_{L2}$, a first tube edge 326B, and a second tube edge 328B. The divaricating pattern PB is defined with respect to a central axis CB that extends along the length of the tube 300B.

A theoretical divaricated cut 350B for a medial portion 330B may be defined with respect to a first divaricating cut pattern $PB_{T1}$, using predefined measurements $DB_{C1}$, $EB_{C1}$, and $GB_{C1}$. $DB_{C1}$ measures the overall height of the theoretical divaricated cut 350B. $EB_{C1}$ measures the maximum width of the divaricated cut 350B and $GB_{C1}$ is narrowest width of the of the divaricated cut 350B. The first divaricating cut pattern $PB_{T1}$ also includes an upper tapered section $370_{B1}$, a lower tapered section $372_{B1}$, and an arc section $374_{B1}$ positioned between the upper tapered section $370_{B1}$ and the lowered tapered section $372_{B1}$. The arc section $374_{B1}$ includes two arc segments $BB_{T1}$, $BB_{T2}$.

A theoretical divaricating cut 360B for a tube end portion 310B may be defined with respect to a second divaricating pattern $PB_{T2}$, using predefined measurements $DB_{C2}$, $EB_{C2}$, $FB_{C2}$, and $GB_{C2}$. $DB_{C2}$ measures the overall height of the theoretical divaricated cut 360B. $EB_{C2}$ measures the distance from the centerline of the cut 360B to the edge of the tube 326B. $FB_{C2}$ is the widest width of the divaricating pattern $PB_{T2}$ and $GB_{C2}$ is narrowest width of the divaricating pattern $PB_{T2}$.

Divaricating patterns $PB_{T1}$, $PB_{T2}$ are further defined with respect to dimensions HBc and $DB_{M2}$. Measurement HBc is the distance between the patterns $PB_{T1}$, $PB_{T2}$ measured from their respective centerlines and $DBm_2$ is the distance from the bottom of divaricating pattern $PB_{T2}$ to the median of the arc section $374_{B1}$, which is parallel with central axis CB.

Preferably, the divaricating patterns PA, PB may cut at internals in the tube are such that they allow the final form of the divaricated-cut contact to exhibit spring-like properties. Moreover, in the embodiments disclosed herein, zig-zag like patterns are preferable such that the final properties of the contact are spring-like. The divaricating patterns PA, PB are also configured such that the amount of bowing that could occur in the medial portion, after cut ting of the tube and during compression is minimal. Alternative variations and divaricating patterns may, however, be used.

The compressible electrical contacts disclosed herein are preferably manufactured from tubes using one or more precision cut ting methods, e.g. laser cut ting. The tube is also preferably manufactured from one or more electrically conductive materials. Suitable materials for the compressible electrical contact include, but are not limited to, brass, copper, beryllium copper and stainless steel. Preferably, these materials have spring-like properties, high strength, high elastic limit, and low moduli.

Overall dimensions for the compressible electrical contacts disclosed herein can range from micro- to large scale. Targeted sizes, however, are on a smaller basis given current industry trends. An exemplary tube size has an inner diameter of about 0.006 inches, an outer diameter of about 0.010 inches, and an overall length of about 0.070 inches. When the compressible electrical contact is manufactured, using a tube having these dimensions and incorporating divaricating pattern, PA, the resulting cut angles can be about 5 degrees, the innermost cut distances can be about 0.001 inches and the outermost cut distance can be about 0.002 inches. And, when the compressible electrical contact is manufactured, incorporating divaricating pattern PB, the resulting upper cut angles can range from about 13 degrees to about 15 degrees, the resulting lower cut angles can range from about 1.5 degrees to about 3.0 degrees with the innermost cut distances being about 0.0006 inches and the outermost cut distance being about 0.002 inches.

Dimensions of the compressible electrical contacts disclosed herein, however, depend on various factors, including but not limited to the contact's spring rate and the length of travel between a substantially relaxed state and a compressed state. Nonetheless, after compression, the compressible electrical contacts disclosed herein will have an effective inner diameter of about 0.006 inches, an effective outer diameter of about 0.010 inches, and an overall length of about 0.070 inches, when manufactured from a tube having an inner diameter of about 0.006 inches, an outer diameter of about 0.010 inches, and an overall length of about 0.070 inches.

FIGS. 14-17 are cross-sectional views of exemplary connector assemblies, with each assembly, including the compressible electrical contact 100 in a substantially compressed state. To further emphasize and illustrate the compressive nature of the compressible electrical contact 100, the contact 100 is not shown in cross-section.

Figure 14:
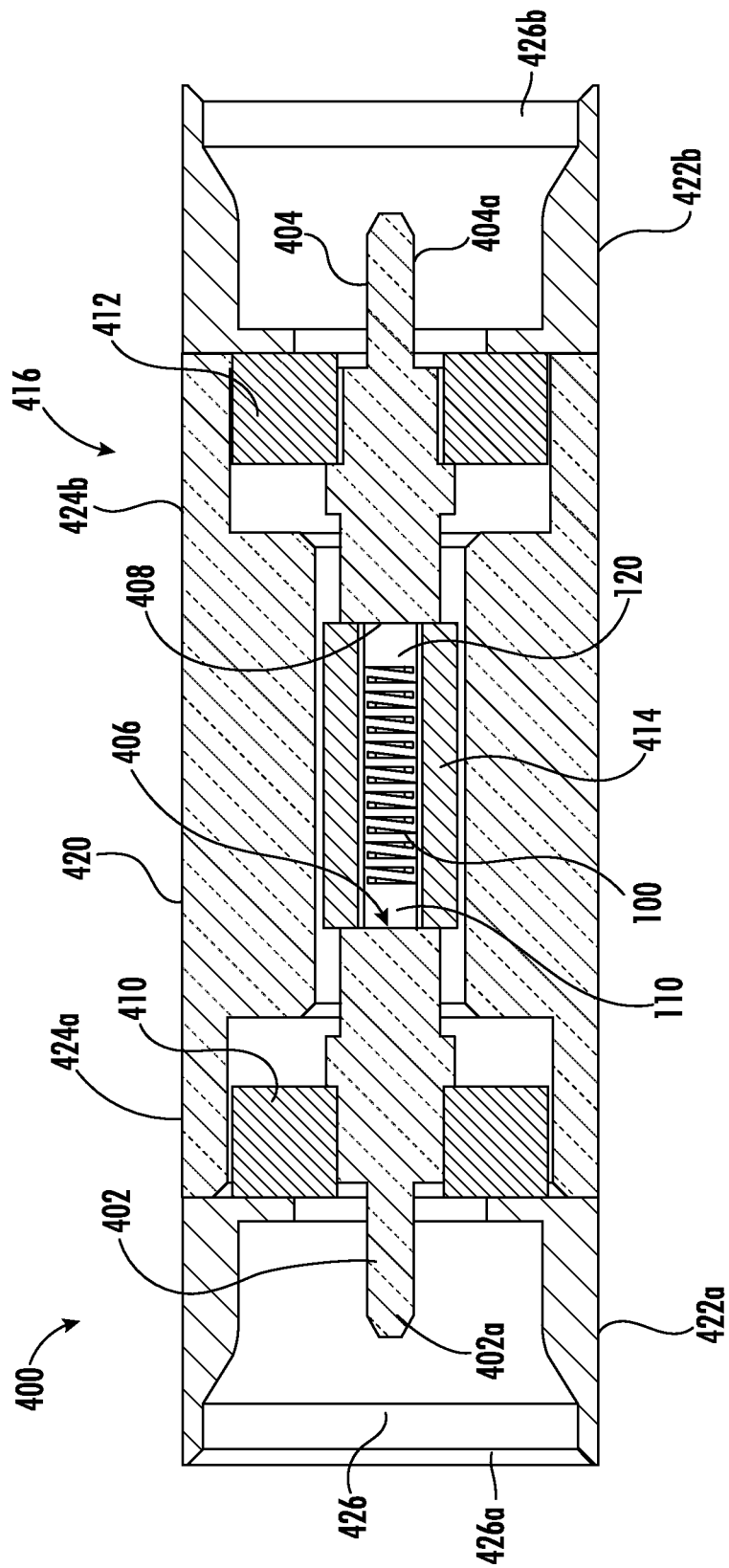
FIGS. 14-17 are cross-sectional views of exemplary connector assemblies, with each assembly, including the compressible electrical contact (not shown cross-sectioned), shown in FIGS. 1-8, in a substantially compressed state.

FIG. 14 shows an exemplary connector assembly 400, including two male pins 402, 404, the compressible electrical contact 100, end dielectrics 410, 412 coupled respectively to pins 402, 404 and a central dielectric 414 disposed around the compressible electrical contact 100. The assembly 400 further shows contact ends 110, 120 contacting pins 402, 404 at contact points 406, 408. The assembly 600 further includes an external housing 416, having a central housing body 420 and housing ends 422a, 422b. The central body 420 has a middle section that extends downwardly toward the central dielectric 414 and central body ends 424a, 424b that abut against end dielectrics 410, 412. Each housing end 422a, 422b includes an end opening 426a, 426b that is contoured with internal opening diameters configured to accommodate end portions 402a, 404a of male pins 402, 404.

Figure 15:
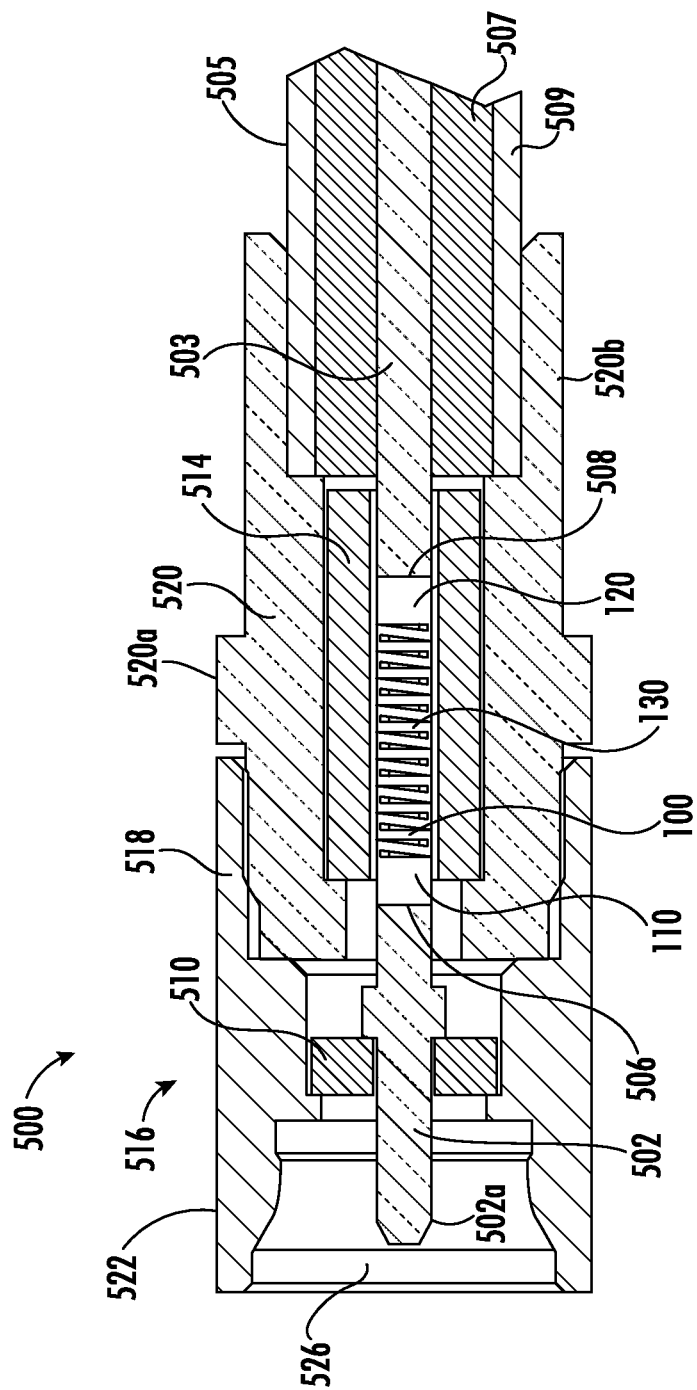

FIG. 15 shows another exemplary connector assembly 500, including a male pin 502A, an end dielectric 510 coupled to the male pin 502A, the compressible electrical contact 100, a central dielectric 514 surrounding the contact 100, an external housing 516, including a first housing body 518 and a second housing body 520. The second housing body 520 surrounds the central dielectric 514 and includes a second housing body end 522, having ends 520a, 520b, coupled to an outer surface of the housing body 520.

Still referring to FIG. 15, the cable 505 includes a cable center conductor 503, a cable dielectric 507, and an outer cable sheath 509. The housing body end 522 has an end opening 526 that is contoured with internal opening diameters configured such that the male pin end 502a is routed freely through the end opening 526. The assembly 500 further shows contact ends 110, 120 contacting the male pin 502A and the center conductor 503 at contact points 506, 508.

Figure 16:
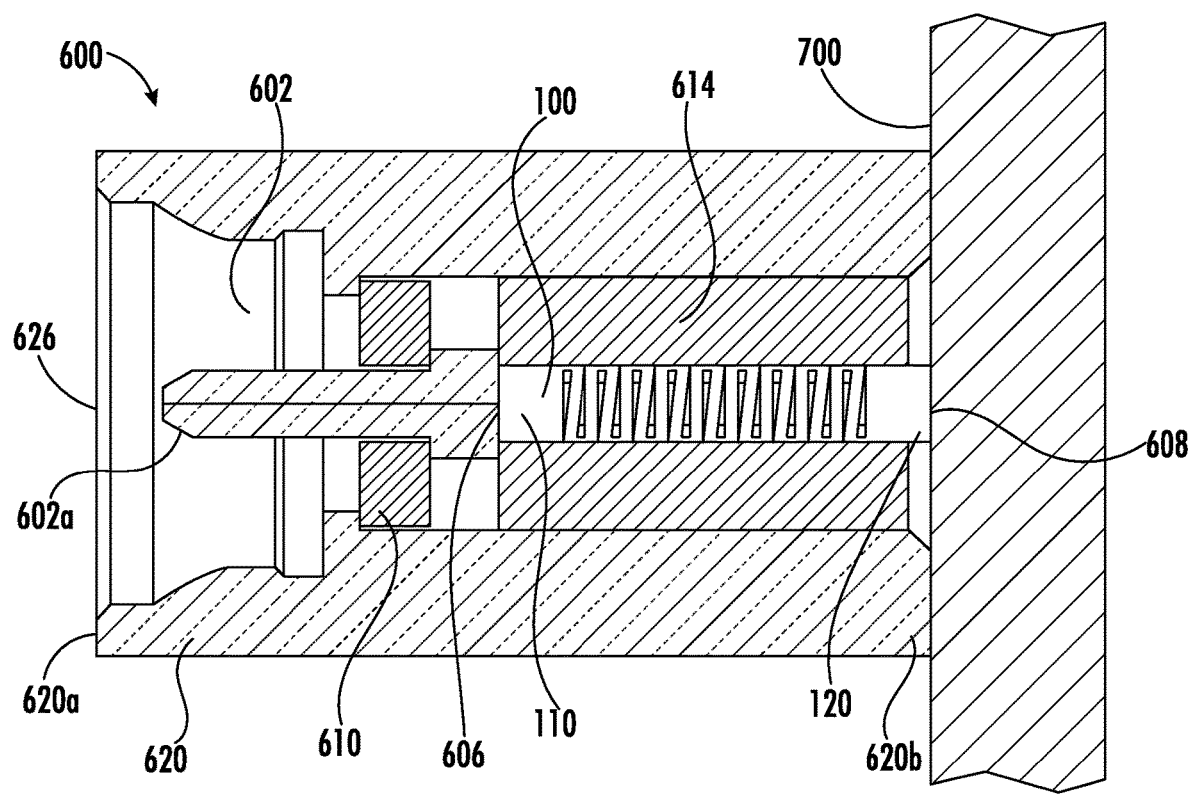

FIG. 16 shows yet another exemplary connector assembly 600, including the compressible electrical contact 100, a male pin 602, an end dielectric 610 surrounding the male pin 602, a central dielectric 614 surrounding the contact 100, a housing body 620 surrounding the end dielectric 610 and a central dielectric 614, a printed circuit board 700 abutting a second body end 620b of the housing body 620. The housing body 620 also includes a first body end 620a, having an end opening 626 that is contoured such that the male pin end 602a is routed freely through the end opening 626. The assembly 600 shows ends 110, 120 of the contact 100 contacting the pin 602 and the printed circuit board 700 at contact points 606, 608.

Figure 17:
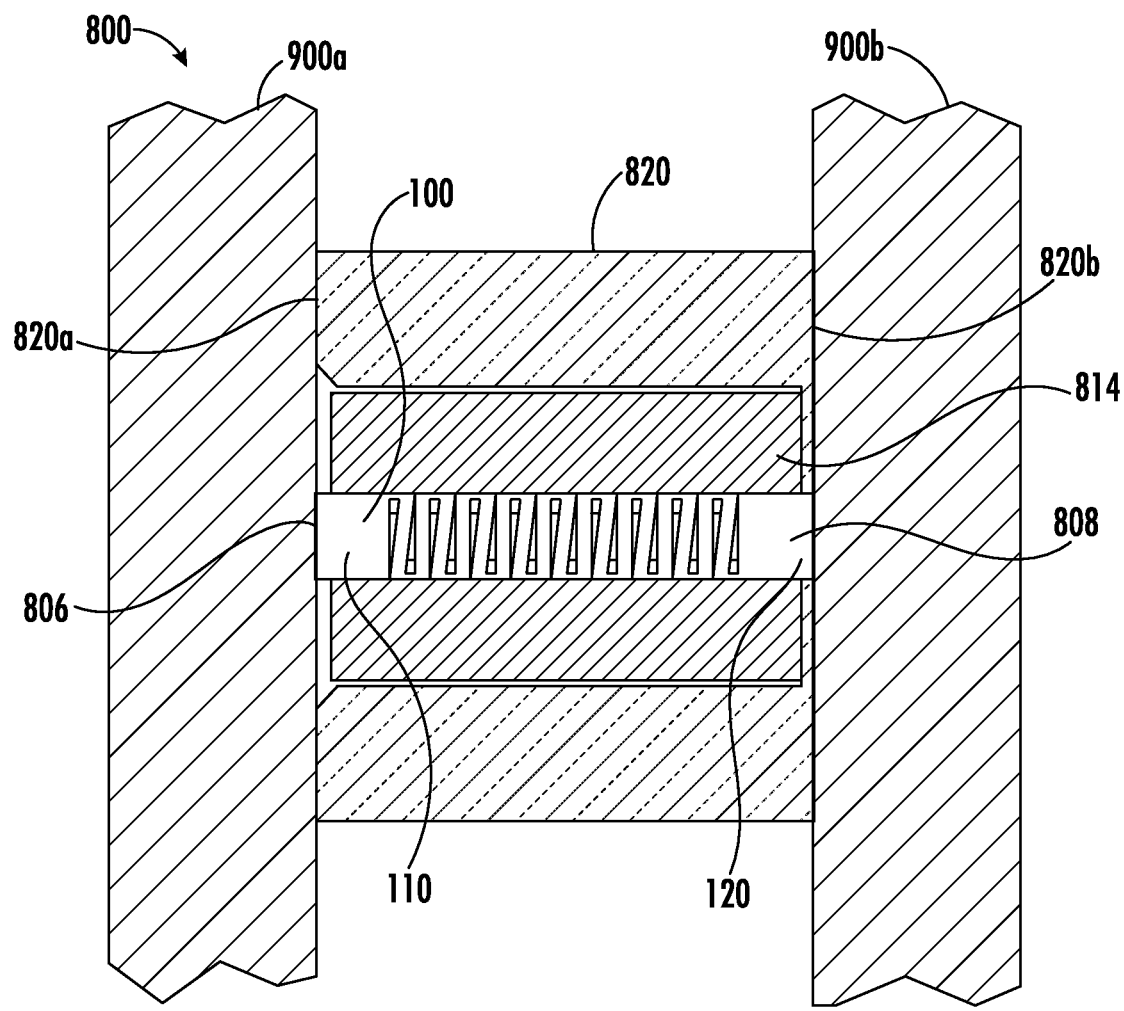

FIG. 17 shows an exemplary connector assembly 800, including the compressible electrical contact 100, a first printed circuit board 900a abutting against the first contact end 110 of the contact 100, a second printed circuit board 900b abutting against the second contact end 120 of the contact 100, a central dielectric 814 surrounding the contact 100, and an external housing body 820 surrounding the central dielectric 814 and having ends 820a, 820b that abut respectively against printed circuit boards 900a, 900b. Here, contact ends 110, 120 are shown contacting each printed circuit board 900a, 900b at contact points 806, 808.

Figure 18:
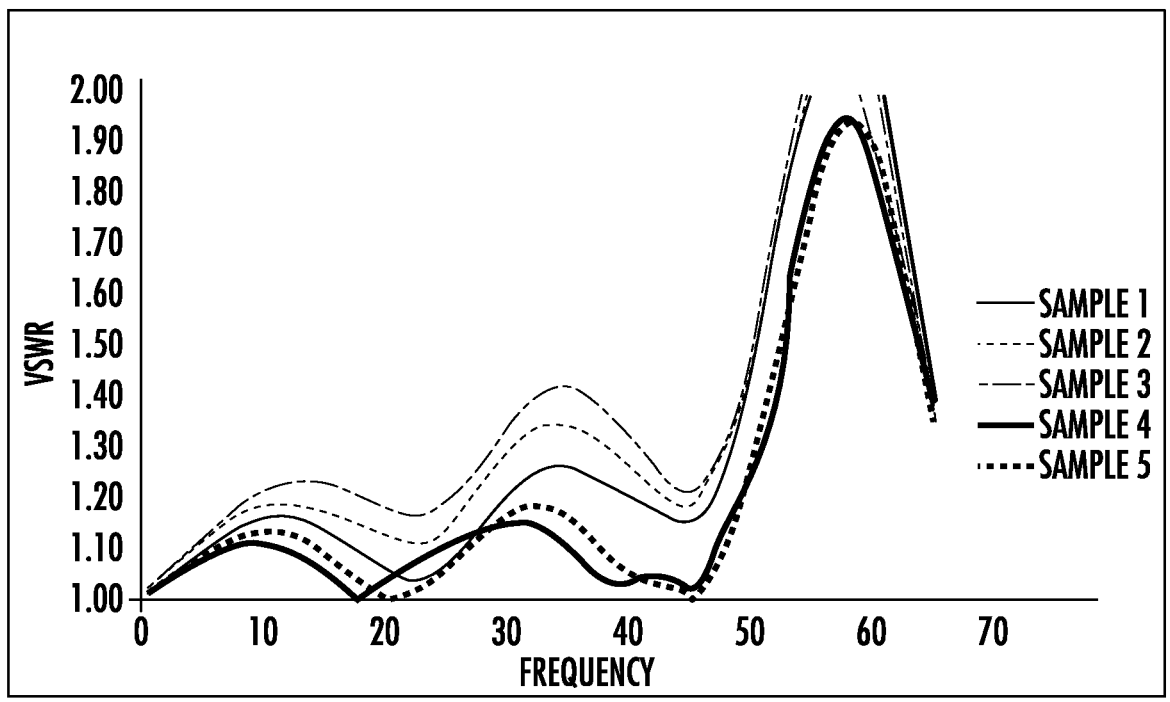
FIG. 18 is a graph showing the relationship of Voltage Standing Wave Ratio (VSWR) to Frequency for samples of compressible electrical contacts in accordance with embodiments disclosed herein.
Figure 19:
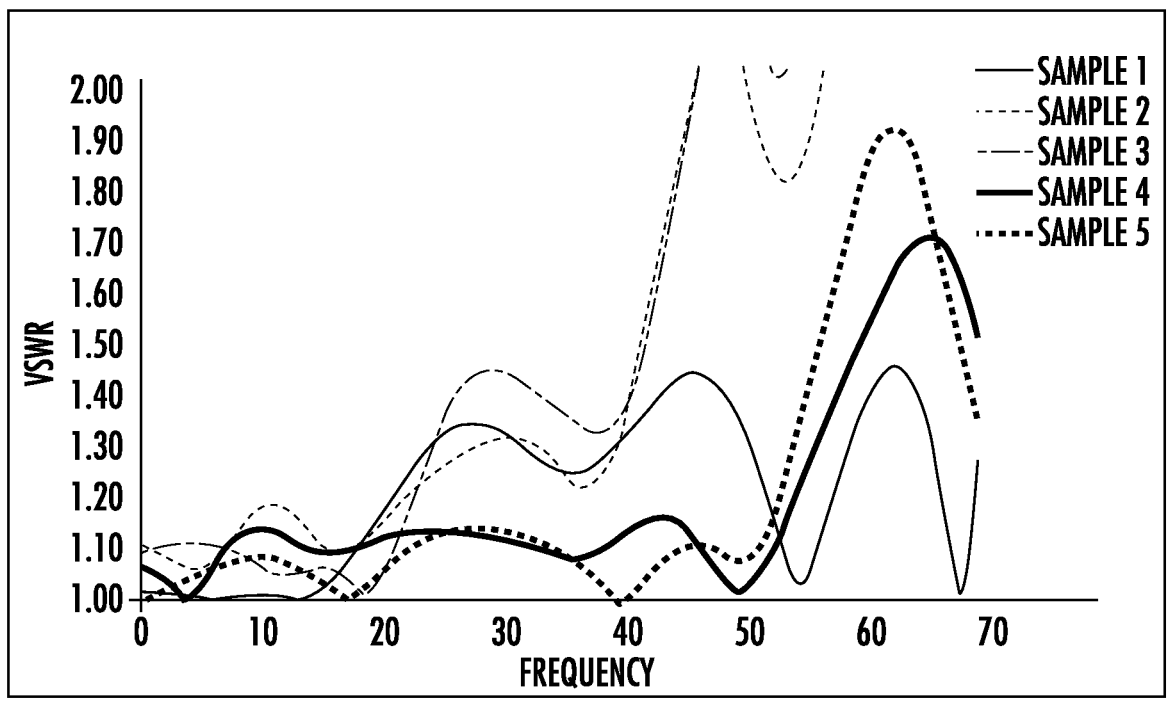
FIG. 19 is a graph showing the relationship of VSWR to Frequency for samples of FUZZ BUTTON® interconnects.

FIGS. 18 and 19 show results from Voltage Standing Wave Ratio (VWSR) tests, measured in accordance with industry standards, including but not limited to MIL-PRF-39012, Sec. 4.6.11. FIG. 18 illustrates the relationship of VWSR to Frequency (GHz) for samples of connector assemblies, with each assembly including a compressible electrical contact in accordance with embodiments disclosed herein. Each set of results is based on each respective compressible electrical contact being installed in an assembly between two male pins, where the compressible electrical contact rests at half of its max travel length.

For comparative purposes, FIG. 19 shows the relationship of VWSR to Frequency (GHz) for sample connector assemblies, having the same testing configuration as used for the test results shown in FIG. 18. In this assembly, however, the compressible electrical contact has been replaced with a FUZZ BUTTON® interconnect. FUZZ BUTTON® interconnects are manufactured by Custom Interconnect LLC.

Accordingly, it will be apparent to those skilled in the art that various modifications and variations can be made to the disclosed embodiments and the elements thereof without departing from the scope of the disclosure. Other embodiments of the present disclosure will be apparent to those skilled in the art from consideration of the specification and practice of the present disclosure. It is intended that the specification and examples be considered as exemplary, with a true scope of the present disclosure being indicated by the following claims and their equivalents.

What is claimed is:

1. A compressible electrical contact, comprising:
a first contact end;
a second contact end opposing the first contact end; and
a plurality of divaricated-cut sections positioned between the first contact end and the second contact end, each of the plurality of divaricated-cut sections being defined by at least one cut angle measured between a pair of outwardly extending opposing inner surfaces, an innermost cut distance, and an outermost cut distance,
wherein the innermost cut distance is smaller than the outermost cut distance,
wherein in a substantially relaxed state, each pair of opposing inner surfaces extends outwardly toward ends of the compressible electrical contact,
wherein in a substantially compressed state, each pair of opposing inner surfaces collapses inwardly to form a tapered slot, and
wherein the outermost cut distance is about 0.002 inches.

2. The compressible electrical contact of claim 1, wherein the compressible electrical contact is manufactured from a tube.

3. The compressible electrical contact of claim 1, wherein the at least one of the plurality of divaricated-cut sections is based on at least one divaricating pattern.

4. The compressible electrical contact of claim 3, wherein the at least one divaricating pattern comprises an upper tapered section and a lower tapered section.

5. The compressible electrical contact of claim 1, wherein the plurality of divaricated-cut sections is included in a medial portion disposed between the first contact end and the second contact end.

6. The compressible electrical contact of claim 5, wherein the plurality of divaricated-cut sections comprises a plurality of inner divaricated-cut sections disposed between the first contact end and the second contact end.

7. The compressible electrical contact of claim 5, wherein the medial portion comprises a plurality of medial elements, and wherein at least some of the plurality of medial elements are adjacent to the divaricated-cut sections.

8. The compressible electrical contact of claim 5, wherein the tube comprises a material selected from the group consisting of brass, copper, beryllium copper, and stainless steel.

9. The compressible electrical contact of claim 1, wherein the at least one cut angle is about 5 degrees.

10. The compressible electrical contact of claim 1, wherein the plurality of divaricated-cut sections comprises a first end cut positioned adjacent to the first contact end.

11. The compressible electrical contact of claim 10, wherein the plurality of divaricated-cut sections comprises a second end cut, opposing the first end cut, positioned adjacent to the second contact end.

12. A compressible electrical contact, comprising:
a first contact end;
a second contact end opposing the first contact end; and
a plurality of divaricated-cut sections positioned between the first contact end and the second contact end, each of the plurality of divaricated-cut sections being defined by at least one cut angle measured between a pair of outwardly extending opposing inner surfaces, an innermost cut distance, and an outermost cut distance,
wherein the innermost cut distance is smaller than the outermost cut distance,
wherein in a substantially relaxed state, each pair of opposing inner surfaces extends outwardly toward ends of the compressible electrical contact,
wherein in a substantially compressed state, each pair of opposing inner surfaces collapses inwardly to form a tapered slot, and
wherein the innermost cut distance is about 0.001 inches.

13. The compressible electrical contact of claim 12, wherein the compressible electrical contact is manufactured from a tube.

14. The compressible electrical contact of claim 12, wherein the at least one of the plurality of divaricated-cut sections is based on at least one divaricating pattern.

15. The compressible electrical contact of claim 12, wherein the plurality of divaricated-cut sections is included in a medial portion disposed between the first contact end and the second contact end.

16. A compressible electrical contact, comprising:
first contact end;
a second contact end opposing the first contact end; and
a plurality of divaricated-cut sections positioned between the first contact end and the second contact end, each of the plurality of divaricated-cut sections being defined by at least one cut angle measured between a pair of outwardly extending opposing inner surfaces, an innermost cut distance, and an outermost cut distance,
wherein the innermost cut distance is smaller than the outermost cut distance,
wherein in a substantially relaxed state, each pair of opposing inner surfaces extends outwardly toward ends of the compressible electrical contact,
wherein in a substantially compressed state, each pair of opposing inner surfaces collapses inwardly to form a tapered slot, and
wherein the compressible electrical contact has an effective outer diameter of about 0.010 inches.

17. The compressible electrical contact of claim 16, wherein the compressible electrical contact is manufactured from a tube.

18. The compressible electrical contact of claim 16, wherein the at least one of the plurality of divaricated-cut sections is based on at least one divaricating pattern.

19. The compressible electrical contact of claim 18, wherein the at least one divaricating pattern comprises an upper tapered section and a lower tapered section.

20. The compressible electrical contact of claim 16, wherein the plurality of divaricated-cut sections is included in a medial portion disposed between the first contact end and the second contact end.

* * * * *